United States Patent Office 3,079,523
Patented Feb. 26, 1963

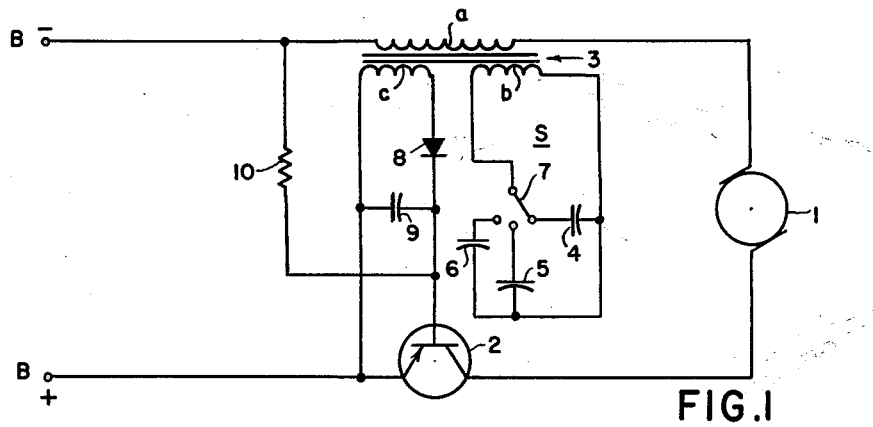
FIG.1
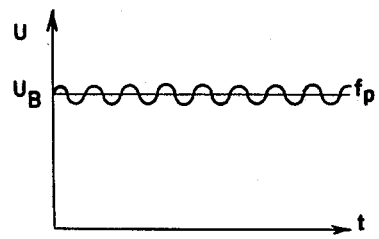
FIG.2
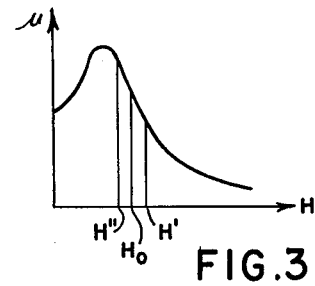
FIG.3
FIG.4
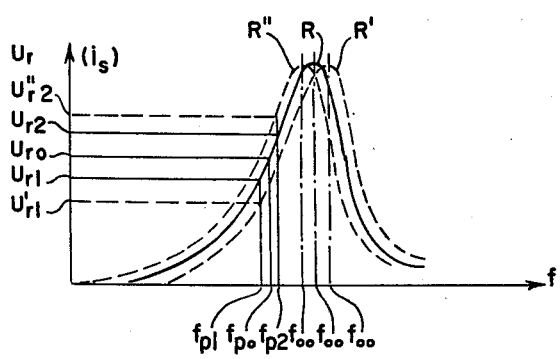
FIG.5
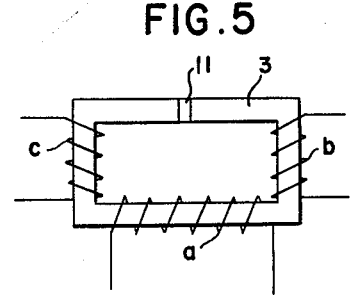

3,079,523
SPEED-REGULATING SYSTEM FOR DIRECT-CURRENT COMMUTATOR MOTORS
Siegfried Thieme, Raisdorf im Holstein, Schleswig-Holstein, Germany, assignor to Electroacustic Gesellschaft mit beschrankter Haftung, Kiel, Germany, a corporation of Germany
Filed Aug. 21, 1961, Ser. No. 136,128
Claims priority, application Germany Aug. 29, 1960
8 Claims. (Cl. 318—309)

My invention relates to a system for regulating the speed of a direct-current motor.

Many purposes, for example the drive of measuring and recording instruments or sound-recording and sound-reproducing equipment, require the use of direct-current drive motors of extremely accurate speed regulation. In such cases the motor speed is supposed to remain constant under varying loads as well as under varying values of operating voltage or other operating conditions. This requires the provision of regulating devices which control the motor mechanically or electrically so as to enforce maintenance of the desired speed. A known device of this type is the centrifugal speed regulator which, in dependence upon the rotating speed, displaces the slide contact of a rheostat, connected in series with the motor, so that the energizing current supplied to the motor is decreased when the datum speed is exceeded and is increased when the speed drops below the datum value. However, due to its mechanical construction, centrifugal speed regulators require continual maintenance, are susceptible to trouble and have too high an inertia for sufficiently sensitive response to rapid changes or fluctuations in motor speed.

An accurate and sensitive system of regulating the speed has become known for high-frequency generators driven by direct-current motors. According to this system, a low-frequency generator has its rotor mounted on the shaft common to the direct-current motor and the high-frequency generator, and the alternating voltage from the low-frequency generator is supplied to an electric oscillatory circuit whose natural frequency is slightly higher than the frequency that corresponds to the proper motor speed. The current induced in the oscillatory circuit actuates a regulator which controls the energizing current of the direct-current motor in such a manner that the motor always runs at the desired speed (German Patent 368,227). Such a complicated and intricate system is uneconomical and practically inapplicable for regulating the speed of small direct-current motors such as those employed for the operation of measuring or recording instruments, phonographic or other sound-recording and reproducing equipment.

It is an object of my invention to eliminate the deficiencies of the known systems and to provide a speed-regulating system of an extremely simple design readily applicable to small direct-current motors yet reliably securing the desired high accuracy of constant-speed operation under varying voltages or loads.

Another object of the invention is to obatin the desired accurate regulating operation without the necessity of providing additional mechanisms or other devices having mechanically movable parts. Another object is to devise a regulating system which readily affords being employed in connection with existing direct-current commutator motors simply by being connected between the motor and the current-supply terminals.

A further object of the invention is to devise a speed regulating system for direct-current commutator motors that is composed of static components of small space requirements and low weight, so as to be particularly suitable for use in portable or self-energized equipment or on vehicles or other conveyances where space or weight or power demands are at a premium.

To achieve these objects, and in accordance with a feature of my invention, I take advantage of the fact that the energizing circuit of a direct-current motor exhibits a superimposed pulsation voltage which originates from the commutation within the motor and has a frequency proportional to the motor speed. More specifically, I derive from this commutation-ripple of the motor energizing voltage a regulating voltage and apply it to an electronic regulating member, such as an electronic tube or preferably a transistor, which is serially connected in the energizing circuit of the direct-current motor to act as a variable resistor; and I thereby apply to the electronic regulating member a resistance control in dependence upon the frequency of the commutation ripple voltage, thus maintaining the motor speed at a given, preferably adjustable, value.

According to another preferred feature of my invention, the above-mentioned regulating voltage is obtained with the aid of an electric oscillatory circuit (tank circuit) whose resonance frequency is slightly higher than the commutation ripple frequency that corresponds to the datum value of motor speed. Furthermore, the regulating voltage is obtained in the sensing circuit which is inductively coupled with the tank circuit. The voltage thus induced in the sensing circuit is rectified and impressed upon the control electrode of the electronic regulating member, for example upon the base of the regulating transistor, the polarity of the rectified voltage being such that the resistance of the regulating member in the energizing circuit of the motor increases with an increase in motor speed as the ripple frequency rises toward the resonance frequency of the tank circuit.

According to still another feature of my invention, I provide the above-mentioned tank circuit with frequency-adjusting means for varying and presetting its resonance frequency to thereby predetermine the datum value of motor speed to be kept constant by the regulating system. This is preferably done by giving the tank circuit one or more adjustable capacitance members which permit a continuous or stepwise setting of the system to respectively different motor speeds.

According to further, more specific features of my invention, I connect in the energizing circuit of the direct-current commutator motor the main path of a triode, for example the emitter-collector path of a transistor, as well as the primary winding of a transformer which has two secondary windings, one of the secondaries forming an inductivity of the above-mentioned tank circuit whereas the other secondary winding is connected through a rectifier with the control electrode of the triode, for example with the base of the transistor.

According to another feature of my invention, the iron core of the above-mentioned transformer is preferably provided with an air gap in which a piece of ferromagnetic material having high initial permeability and low sauration is disposed. This has the result that the regulation operates with great sensitivity even when the motor is subjected to varying mechanical loads.

The foregoing and other objects, advantages and features of my invention, said features being set forth with particularity in the claims annexed hereto, will be apparent from, and will be mentioned in, the following with reference to the embodiment of a regulating system according to the invention illustrated by way of example on the accompanying drawing in which:

FIG. 1 is a circuit diagram of a regulating system for a direct-current commutator motor;

FIGS. 2, 3 and 4 are explanatory graphs relating to the performance of the system; and FIG. 5 shows schematically a transformer applicable in the system.

Denoted by 1 in FIG. 1 is a direct-current commutator motor whose speed is to be regulated for constancy. The energizing circuit of the motor is connected to positive and negative terminals B that are to be connected to a suitable direct-current source.

Assuming the voltage U at terminals B to be constant when the motor is at rest, the operation of the motor, when running, causes its commutator to superimpose upon the voltage U a pulsating voltage so that the resultant voltage $U_B$ exhibits a commutation ripple as schematically shown in the voltage-time diagram of FIG. 2. The ripple frequency $f_p$ is due to the periodic change in polarity occurring at the commutator of the motor and hence is proportional to the speed of the motor.

Series-connected into the energizing circuit of the motor is the emitter-collector path of a p-n-p junction transistor 2 (FIG. 1) which serves to operate as a variable resistance. Also connected in series with motor 1 between the terminals B is the primary winding $a$ of a transformer 3 with two secondary windings $b$ and $c$. The secondary winding $b$ forms part of a tank circuit S and is connected with capacitors 4, 5 and 6 which can be selectively connected into the tank circuit S by means of a selector switch 7. As will be explained, the constant speed for which the motor 1 is regulated depends upon the selected setting of switch 7 and hence upon which one of the three capacitors forms part of the tank circuit at a time. The tank circuit is so tuned that resonance occurs at a frequency which is slightly above the frequency $f_{po}$ that corresponds to the datum speed of motor 1 and hence to the ripple frequency $f_p$ of the motor energizing current.

The energizing current of the motor is loosely coupled through winding $a$ of transformer 3 with the tank circuit S composed of winding $b$ and one of the capacitors 4, 5 or 6. When direct voltage is impressed upon the terminals B, the current passes from the minus pole through the winding $a$ through the motor 1 and the transistor 2 to the plus pole. The base of the transistor 2 is connected through a resistor 10 with the minus pole and in this manner receives a negative bias potential so that the transistor is turned on when the motor speed is zero. Under these conditions, therefore, the motor can start. As soon as the motor has reached a certain value of speed, that is, when the pulsation frequency of the motor current approaches the resonance frequency of the tank circuit S, the voltage amplitudes in the resonance circuit commences to steeply increase. Consequently, now appreciable induced voltage occurs in the secondary winding $c$ of the transformer. This secondary voltage is rectified in a rectifier 8 and filtered by a capacitor 9 to appear as a positive direct potential at the base of the transistor 2 with the result of overcoming the negatively biased base of the transistor so that the resistance of the emitter-collector path increases with increasing motor speed up to the point at which the pulsation frequency $f_p$ is equal to the resonance frequency $f_{oo}$ of the tank circuit S.

The rectified voltage $U_r$ at base 2, substantially proportional to the amplitude of the resonance voltage of the tank circuit S, is exemplified by curve R in FIG. 4 in dependence upon the frequency $f$. Curve R also corresponds essentially to the resonance characteristic of the tank circuit.

The negative bias at the base of transistor 2, and hence the value of resistor 10, is preferably so chosen that the ripple frequency $f_{po}$ that corresponds to the datum speed, is located in the range of the steep ascent of the resonance curve of tank circuit S, so that small frequency changes and hence small changes in motor speed cause a great change in control voltage $U_r$ (FIG. 4), thus securing high sensitivity of regulation. When the motor speed departs upwardly from the datum value, the pulsation frequency may rise, for example, to the value $f_{p2}$ and the control voltage may reach the value $U_{r2}$ which turns the transistor 2 off to a greater extent than the voltage $U_{ro}$. Consequently, the terminal voltage at the motor and hence its speed are reduced. When the motor speed departs from the datum value downwardly, the opposite performance takes place. Consequently, the system operates to maintain the motor speed constant at the proper datum value.

By operation of the switch 7 differently large capacitance values 4, 5 or 6 can be connected with the winding $b$ of transformer 3. In this manner, the tuning of the tank circuit 3 is changed accordingly for the purpose of adjusting different respective datum speeds for the motor 1.

For increasing the sensitivity of regulation at speed changes determined by changes in load imposed upon the motor, the core of the transformer 3, consisting preferably of laminated iron, is preferably given an air gap in which a piece of ferromagnetic material of high initial permeability and low saturation is arranged. Such a core is schematically shown in FIG. 5 where the inserted piece is denoted by 11. FIG. 3 shows a typical characteristic of such a material, the abscissa denoting magnetic field strength (H) and the ordinate denoting magnetic permeability ($\mu$). The cross section of piece 11 is so dimensioned that, with a low motor load, the reversing point of the $\mu$-curve (FIG. 3) is just reached by the direct-current component of the motor-energizing current. If, due to a higher mechanical load upon the motor, the motor-energizing current increases, the magnetic field strength in the air gap rises from $H_o$ to $H'$ and concurrently the permeability $\mu$ of the compensating piece 11 decreases steeply. As a result, the inductivity of the winding $b$ decreases, and the tank circuit S becomes de-tuned so that the regulating curve R (FIG. 4) of resonance frequency $f_{oo}$ is displaced to curve R' of resonance frequency $f'_{oo}$. Consequently, when the speed of the motor drops because of the higher mechanical load so that the ripple frequency drops to $f_{p1}$, the regulating voltage drops to $U'_{r1}$, whereas without the compensating piece 11, it would drop only to $U_{r1}$. Analogously, when the mechanical load on the motor declines, the regulating curve R shifts to R" so that now resonance occurs at $f''_{oo}$. When the pulsation frequency increases to $f_{p2}$, the regulating voltage increases to the values $U''_{r2}$ without the compensating piece 11. Consequently, with respect to speed variations due to changes in mechanical loading, the provision of a suitable ferromagnetic piece in the air gap of the transformer core greatly increases the steepness of the regulating curve as compared with the regulating curve R obtaining with a constant inductivity of winding $b$ in the tank circuit S.

An outstanding advantage of regulating systems according to the invention resides in the fact that no additional mechanisms are required and that the components of the system can readily be inserted into the energizing circuit of any direct-current commutator motor between the current source and the motor. The required expenditure in components, space and weight is extremely slight.

It will be obvious to those skilled in the art, upon studying this disclosure, that the invention permits of various modifications. For example, the p-n-p transistor may be substituted by an n-p-n transistor or by an electronic tube, with a corresponding choice of the voltage polarities. Furthermore, the speed setting can be adjusted continuously by employing a rotary capacitor instead of the stepwise adjustable capacitors 4, 5, 6 in the tank circuit. The sensing or triode-control circuit, instead of being inductively linked with the primary winding $a$ may also be inductively linked with another inductance coil in the tank circuit S. Such and other changes, not affecting the principles of my invention, are indicative of the fact that the invention can be given embodiments other than particularly illustrated and described herein, without departing from the essential features of the invention and within the scope of the claims annexed hereto.

The material for the piece 11 may constitute, for example, the high-permeability ferrites or the iron-nickel-alloys designated by the trade names "Hyperm," "Permalloy" or "Mu-Metal."

I claim:

1. A system for regulating the speed of a direct-current motor, comprising direct-voltage supply leads, a direct-current motor having a commutator circuit connected to said leads to be energized therefrom, an electronic variable resistance member series-connected in said circuit and having a control electrode for controlling the resistance of said member, sensing means coupled with said circuit and responsive to the frequency of the pulsating voltage component due to commutation of said motor, and circuit means connecting said sensing means with said control elecrode for causing the latter to control said resistance for constant speed of said motor.

2. A system for regulating the speed of a direct-current motor, comprising direct-voltage supply leads, a direct-current motor connected between said two leads to be energized therefrom, a transistor having a collector-emitter path serially interposed between said motor and one of said leads and having a base electrode for controlling the resistance of said path, sensing means coupled with one of said leads and responsive to the voltage pulsation due to commutation of said motor, and circuit means connecting said sensing means to said base for controlling said resistance to maintain constant speed of said motor.

3. A motor-speed regulating system comprising a direct-current commutator motor having an energizing circuit, an electronic variable resistance member series-connected in said circuit and having a control electrode for controlling the resistance of said member, a tank circuit having a resonance frequency slightly above the commutation-responsive frequency of the voltage fluctuations obtaining in said energizing circuit at the datum speed of said motor, said tank circuit being coupled with said energizing circuit, a sensing circuit coupled with said tank circuit for providing a regulating voltage in response to resonance between said energizing circuit and tank circuit, said sensing circuit being connected to said control electrode for controlling said resistance to maintain constant speed of said motor.

4. A motor-speed regulating system comprising a direct-current commutator motor having an energizing circuit, an electronic variable resistance member series-connected in said circuit and having a control electrode for controlling the resistance of said member, a tank circuit having a resonance frequency slightly above the commutation-responsive frequency of the voltage fluctuations obtaining in said energizing circuit at the datum speed of said motor, said tank circuit being coupled with said energizing circuit, a sensing circuit coupled with said tank circuit for providing an alternating voltage at resonant excitation of said tank circuit from said energizing circuit, rectifier means connected in said sensing circuit and connected to said control electrode, said rectifier means having the poling required for increasing said resistance with increasing motor speed, whereby said resistance is controlled to maintain the speed at said datum value.

5. A motor-speed regulating system comprising a direct-current commutator motor having an energizing circuit, a transistor having a collector-emitter path serially connected in said energizing circuit and having a base electrode for controlling the resistance of said path, a tank circuit having a resonance frequency slightly above the commutation-responsive frequency of the voltage fluctuations obtaining in said energizing circuit at the datum speed of said motor, said tank circuit being coupled with said energizing circuit, a sensing circuit coupled with said tank circuit for providing an alternating voltage at resonant excitation of said tank circuit from said energizing circuit, rectifier means connected in said sensing circuit and connected to said base electrode, said rectifier means having the poling required for increasing said resistance with increasing motor speed, and resistance means connecting said base electrode with said energizing circuit for normally applying a resistance reducing bias potential to said base electrode, whereby said resistance is controlled to maintain constant motor speed at said datum value.

6. In a motor-speed regulatng system according to claim 3, said tank circuit comprising frequency setting means for adjusting the resonance frequency to thereby set the value of said datum speed.

7. A motor-speed regulating system comprising a direct-current commutator motor having an energizing circuit, a triode having a main path and having a control electrode for varying the resistance of said main path, a transformer having a primary winding and two secondary windings, said triode main path and said primary winding being both series-connected in said energizing circuit, a tank circuit having capacitance means and having an inductance constituted by one of said secondary windings, said tank circuit having a resonance frequency slightly above the commutation pulse frequency of the voltage in said energizing circuit, rectifier means connected between said other secondary winding and said control electrode, said triode being normally biased for minimum resistance of said main path and said rectifier means being poled for increasing said resistance with increase in motor speed, whereby said resistance is controlled to maintain constant motor speed.

8. In a speed-regulating system according to claim 7, said transformer comprising a core having a transverse gap, a piece filling said gap and consisting of ferromagnetic material having high initial permeability and low saturation.

No references cited.